May 8, 1928.

O. C. THOMPSON 1,669,383

MACHINE FOR USE IN MAKING BOXES

Filed Aug. 17, 1923

INVENTOR
Osceola C. Thompson
BY
Edward Thurne Jr
ATTORNEY.

May 8, 1928.

O. C. THOMPSON 1,669,383

MACHINE FOR USE IN MAKING BOXES

Filed Aug. 17, 1923 13 Sheets-Sheet 6

INVENTOR.
Oscela C. Thompson
BY
Edward Dunne Jr.
ATTORNEY.

May 8, 1928.
O. C. THOMPSON
1,669,383
MACHINE FOR USE IN MAKING BOXES
Filed Aug. 17, 1923    13 Sheets-Sheet 7
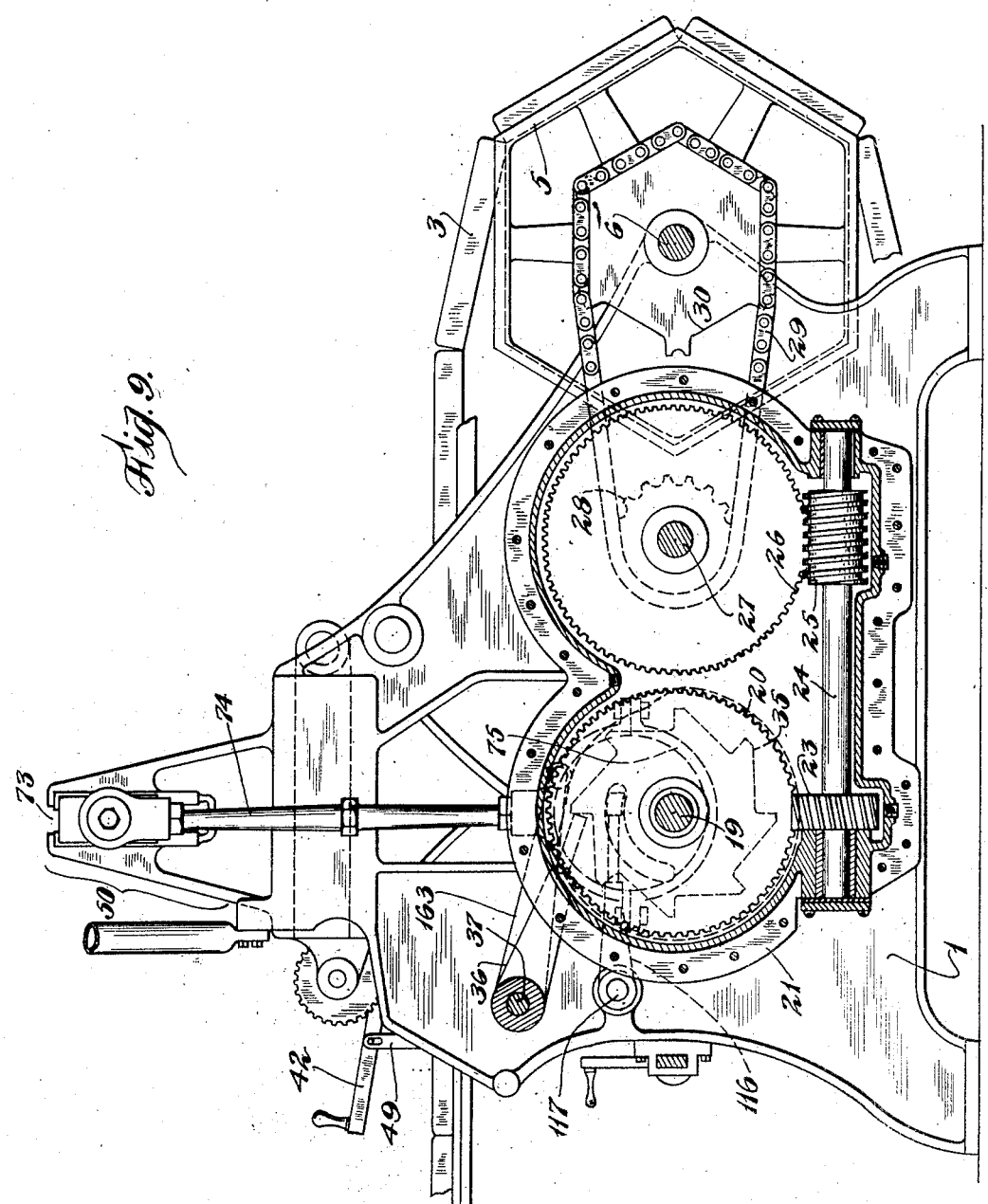
INVENTOR.
Osceola C. Thompson
BY
Edward Dunne Jr
ATTORNEY.

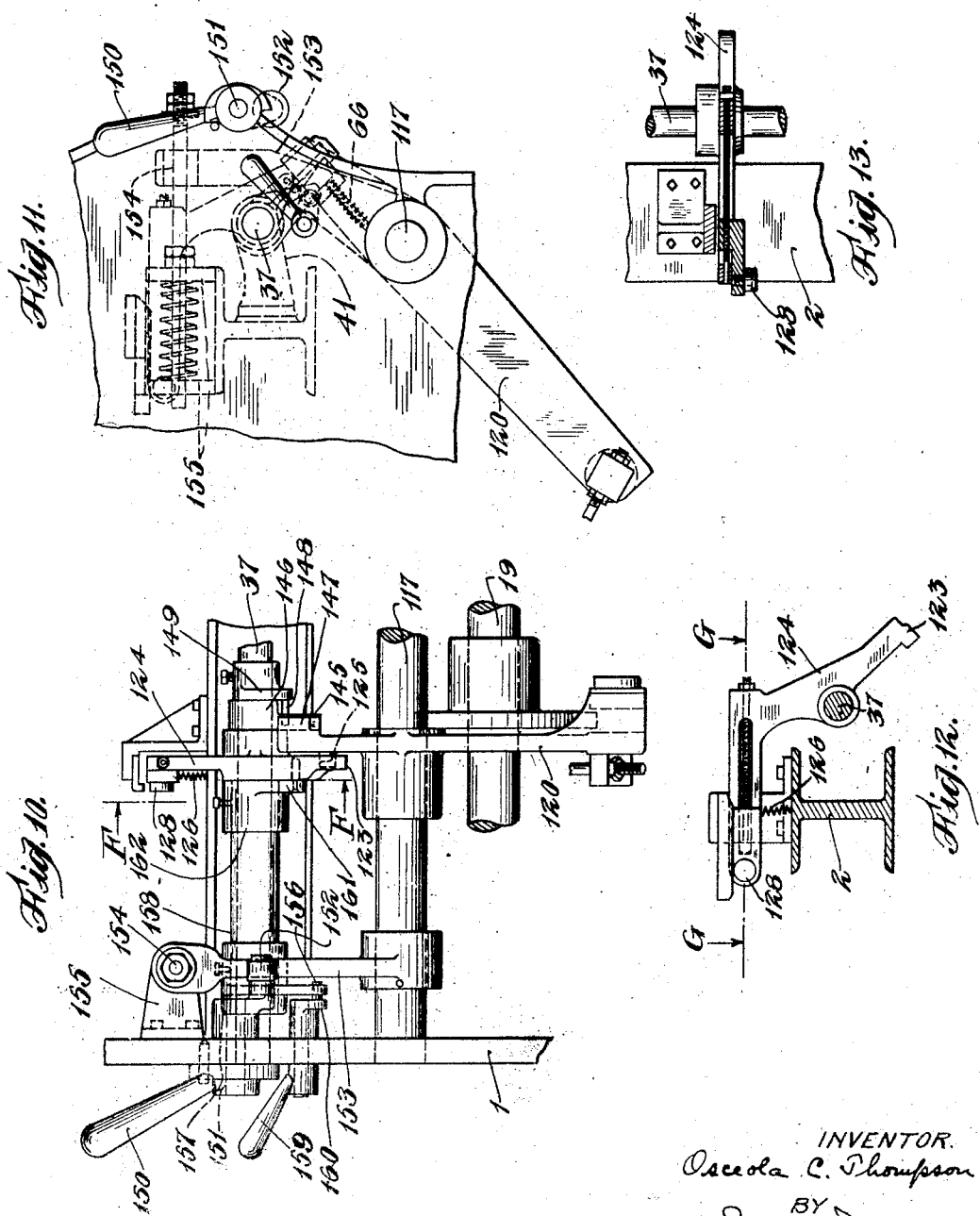

May 8, 1928.
O. C. THOMPSON
1,669,383
MACHINE FOR USE IN MAKING BOXES
Filed Aug. 17, 1923
13 Sheets-Sheet 9
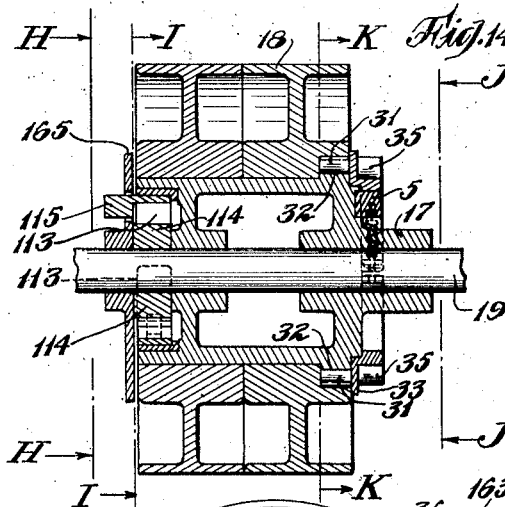
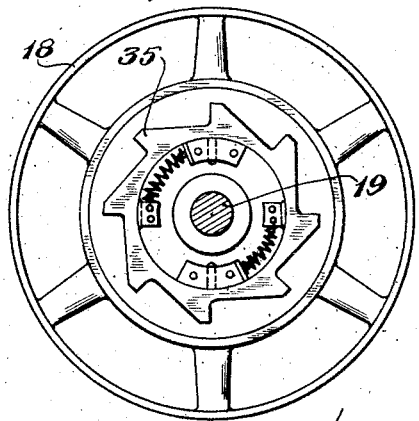
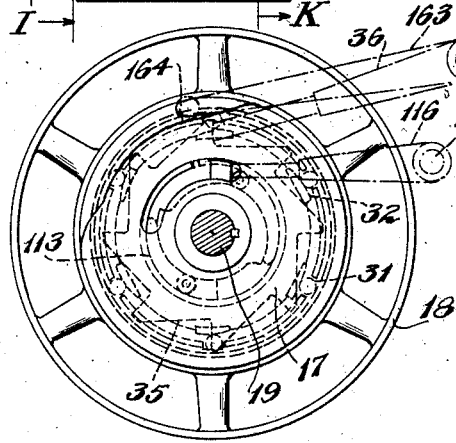
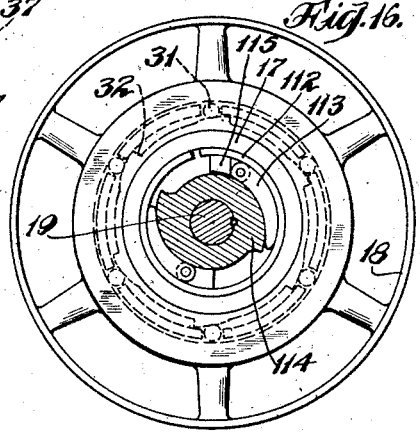
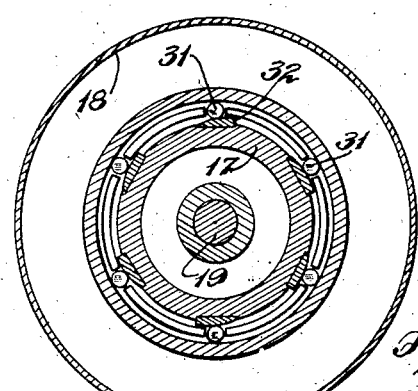
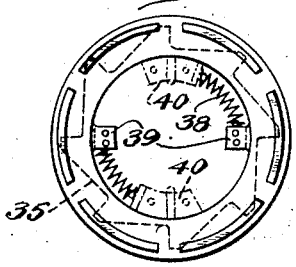
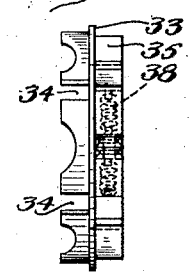
INVENTOR.
Osceola C. Thompson
BY
Edward Tennent Jr.
ATTORNEY.

May 8, 1928.
O. C. THOMPSON
MACHINE FOR USE IN MAKING BOXES
Filed Aug. 17, 1923  13 Sheets-Sheet 10
1,669,383
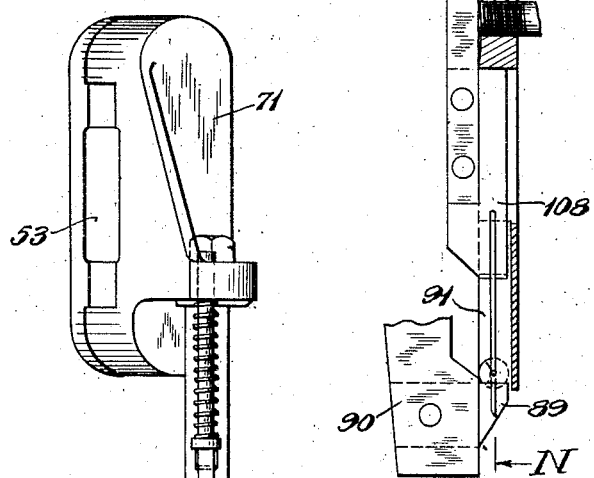
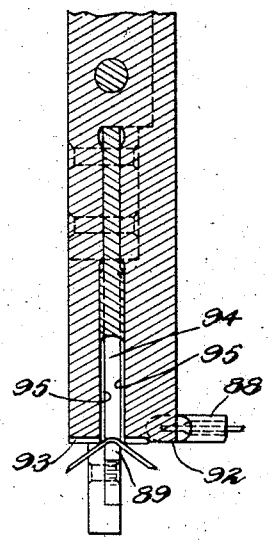
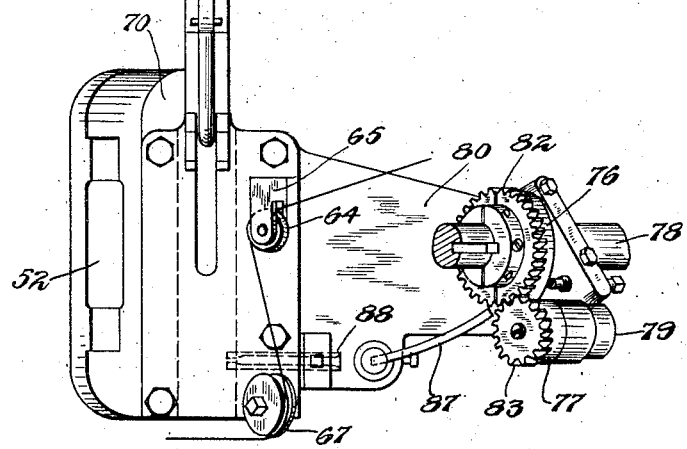
INVENTOR
Osceola C. Thompson
BY
Edward Dunne Jr.
ATTORNEY.

May 8, 1928.
O. C. THOMPSON
1,669,383
MACHINE FOR USE IN MAKING BOXES
Filed Aug. 17, 1923   13 Sheets-Sheet 11
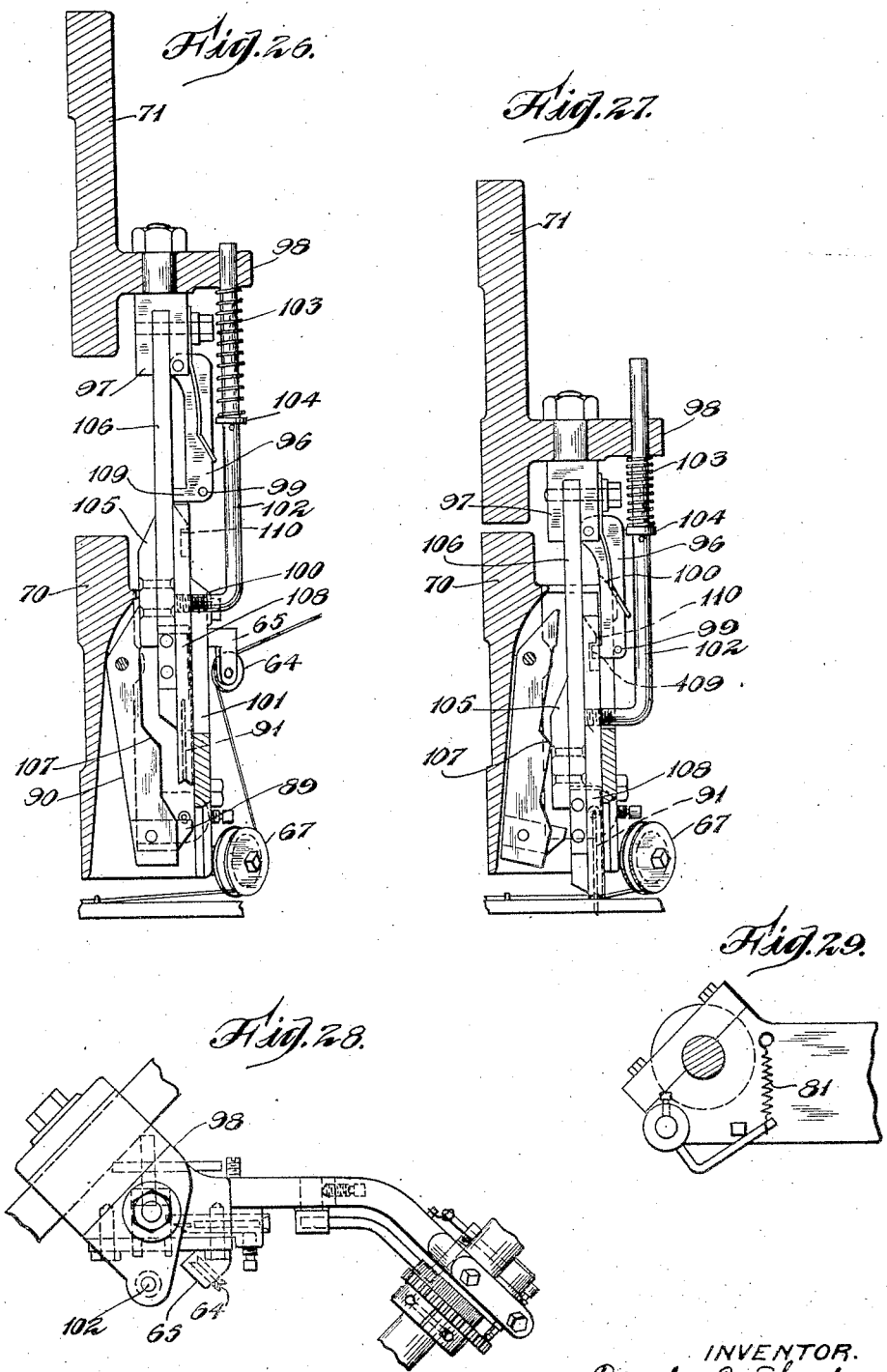

May 8, 1928.
O. C. THOMPSON
MACHINE FOR USE IN MAKING BOXES
Filed Aug. 17, 1923     13 Sheets-Sheet 12
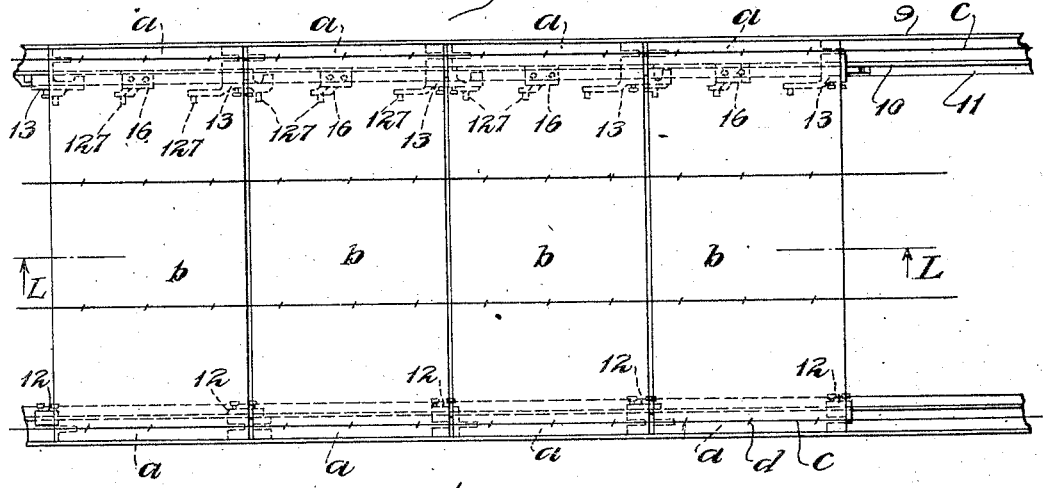
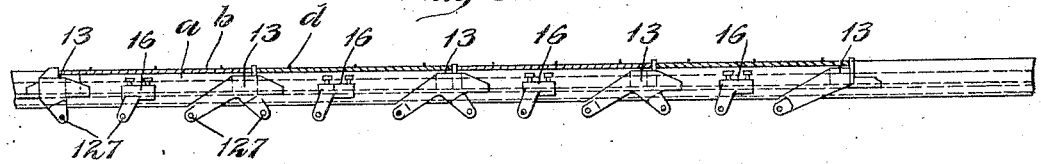
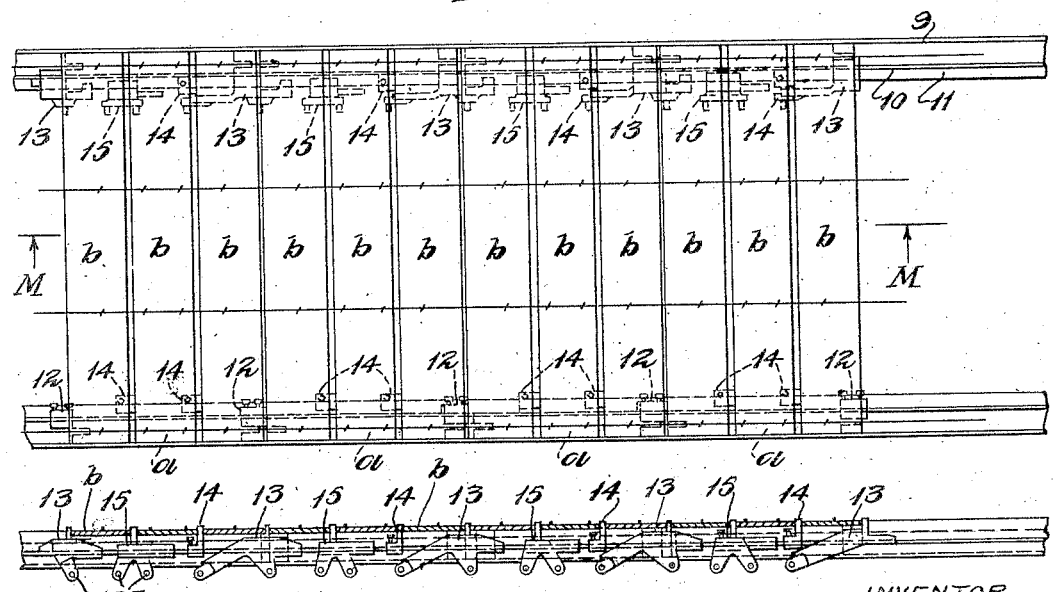
INVENTOR.
Osceola C. Thompson
BY Edward Dunnel Jr.
ATTORNEY.

May 8, 1928.
O. C. THOMPSON
1,669,383
MACHINE FOR USE IN MAKING BOXES
Filed Aug. 17, 1923　　13 Sheets-Sheet 13
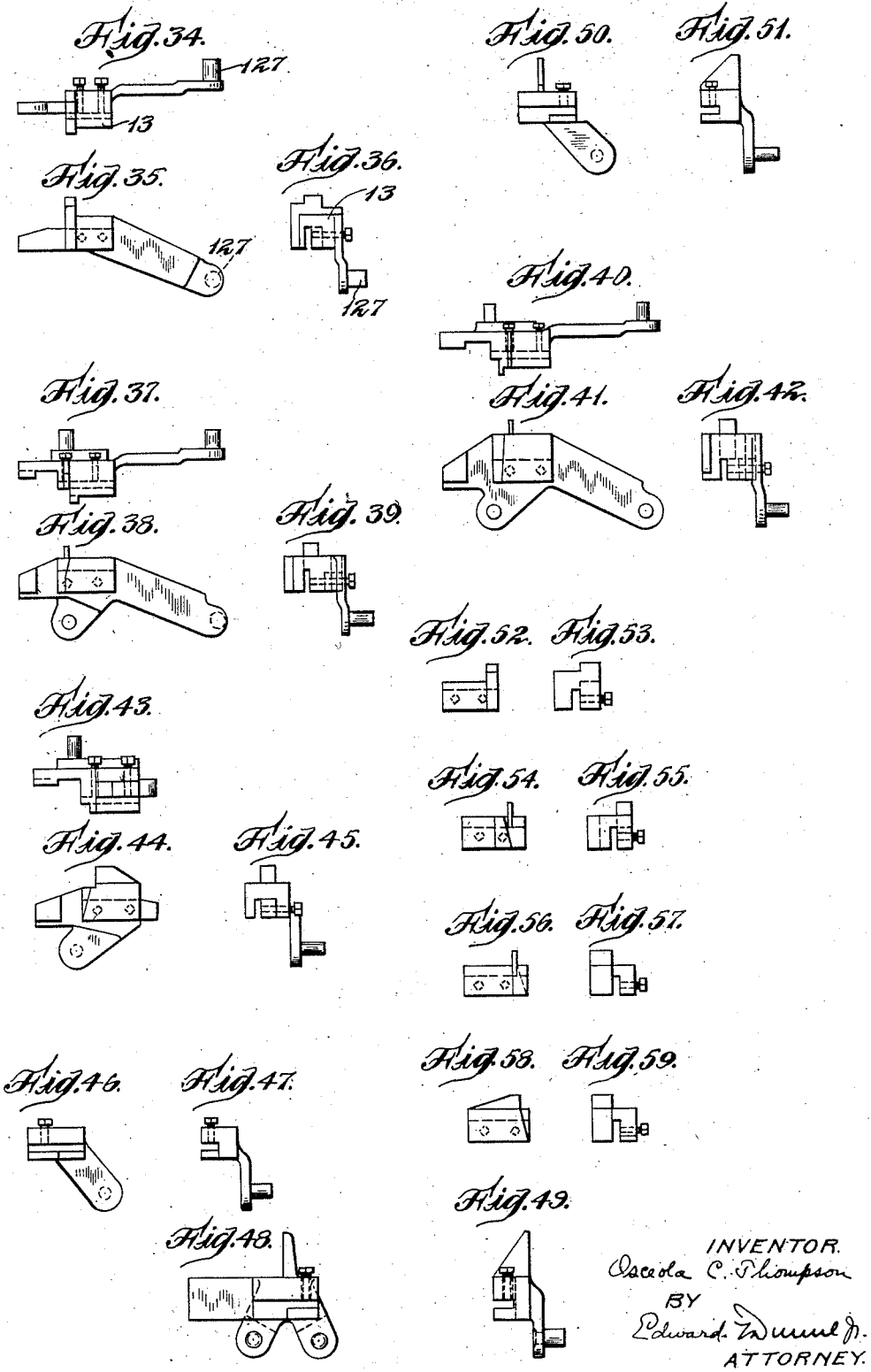
INVENTOR.
Osceola C. Thompson
BY
Edward Wurmel Jr.
ATTORNEY.

Patented May 8, 1928.

1,669,383

UNITED STATES PATENT OFFICE.

OSCEOLA C. THOMPSON, OF ROCKAWAY, NEW JERSEY, ASSIGNOR TO WIREBOUNDS PATENTS COMPANY, A CORPORATION OF MAINE.

MACHINE FOR USE IN MAKING BOXES.

Application filed August 17, 1923. Serial No. 657,924.

This invention relates to machines for assembling and securing together materials for boxes, crates, box or crate blanks, or parts thereof.

Among other objects, the invention is intended to provide an efficient machine for use in producing an improved box or crate; to provide a machine for securing together assembled box or crate parts by driving fasteners at predetermined selected points in the work to secure in the product a maximum strength with a minimum number of fasteners and to keep fasteners out of regions in the work where they are not only useless but undesirable; to provide a machine for fastening together assembled box parts in which the fasteners are positioned at predetermined points in the work by controlling the operations of the fastener-setting mechanism; to provide a machine for making box or crate blanks in which the box or crate parts are fed continuously at approximately a uniform speed to the fastener-setting mechanism which operates to drive fasteners into the moving work and in which the operations of the fastener-setting mechanism are controlled by the work-feeding means to position fasteners at predetermined points in the work; to provide an improved machine for assembling in foldable relationship a plurality of sections of materials for box or crate blanks and connecting said sections with binding wire secured thereto at predetermined selected points by staples driven over the binding wire into or through the box or crate parts; and generally to provide an improved machine of the class described which may be economically operated at high speed to produce an improved quality of box or crate blank on a large commercial scale.

In the drawings:

Fig. 9 is a sectional view of the machine taken on the line E—E of Fig. 2.

Fig. 10 is an enlarged front elevation of a portion of the machine viewed from the right in Fig. 1 at a point immediately in front of the stapling mechanism showing details of the stapler - control - operating mechanism and the machine-control levers.

Fig. 11 is a side elevation of part of the mechanism shown in Fig. 10.

Fig. 12 is a sectional view taken on the line F—F of Fig. 10.

Fig. 13 is a sectional view taken on the line G—G of Fig. 12.

Fig. 14 is an enlarged vertical section of a portion of the stapler operating shaft and pulleys thereon showing the clutch connections between the drive pulley and its hub and the clutch connection between the hub of the drive pulley and the stapler operating shaft.

Fig. 15 is an end view seen from H—H in Fig. 14.

Fig. 16 is a sectional view taken on the line I—I of Fig. 14.

Fig. 17 is an end view seen from J—J in Fig. 14.

Fig. 18 is a sectional view taken on the line K—K of Fig. 14.

Fig. 19 is a side elevation of the ring member which operates to clutch the drive pulley to its hub.

Fig. 20 is an end elevation of the same.

Fig. 21 is a side elevation of the ring member which operates to clutch the stapler shaft to the hub of the drive pulley.

Fig. 22 is an end elevation of the same.

Figure 1:
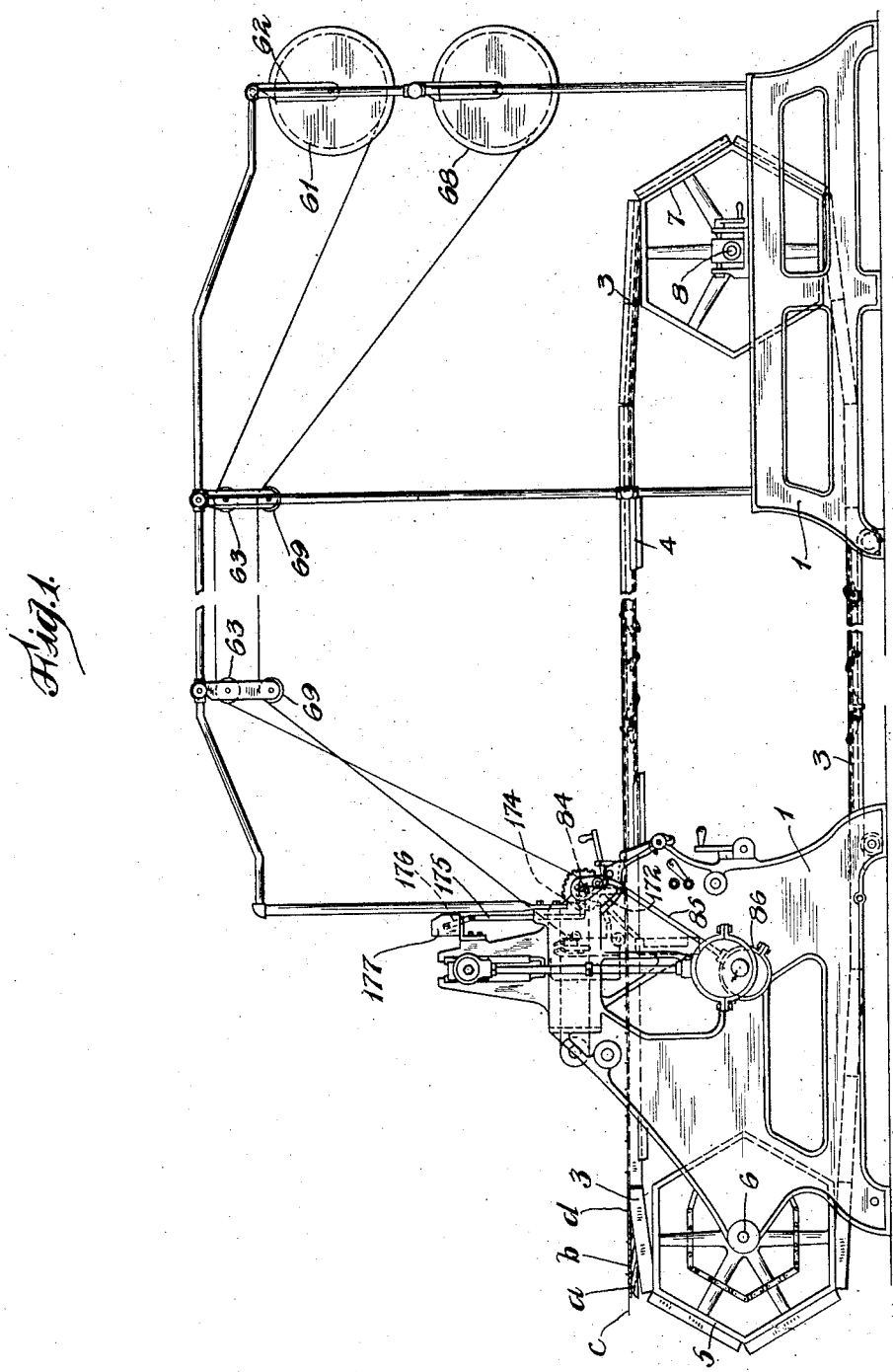
Fig. 1 is a side elevation of a wirebound box blank machine embodying the invention.

Fig. 23, on an enlarged scale, is a detail in perspective of the staple-forming and driving mechanism.

Figs. 24 and 25 are sectional details of the staple-forming and driving mechanism, Fig. 25 being a section on the line N—N of Fig. 24.

Fig. 26 is a vertical section through parts shown in Fig. 23.

Fig. 27 is a view similar to Fig. 26 showing parts in a different position.

Fig. 28 is a plan of the staple-forming and driving mechanism shown in Fig. 23.

Fig. 29 is a detail elevation of the feeding means for the staple stock wire.

Fig. 30 is a top plan view of the work-feeding chains showing the work-positioning and staple-controlling blocks and materials for a box blank thereon. In this figure, the chains are travelling toward the right.

Fig. 31 is a sectional view taken on the line L—L of Fig. 30.

Fig. 32 is similar to Fig. 30 but showing blocks and materials for a crate as distinguished from a box.

Fig. 33 is a sectional view taken on the line M—M of Fig. 32.

Figs. 34, 35 and 36 are, respectively, on an enlarged scale, a top plan view, a side elevation and an end elevation of the leading block on the upper chain in Figs. 30 and 32, said block being the leading combination work-positioning and staple-controlling block for a box or crate blank.

Figs. 37, 38 and 39 are similar views of the middle block on the upper chain in Figs. 30 and 32, said block being the combination work-positioning and staple-controlling block for insertion between the two inside sections of a box or crate blank.

Figs. 40, 41 and 42 are similar views of the blocks on the upper chain in Figs. 30 and 32, which are inserted between the first and second and the third and fourth sections, respectively, said blocks being combination work-positioning and staple-controlling blocks for a box or crate blank.

Figs. 43, 44 and 45 are similar views of the last block on the upper chain in Figs. 30 and 32, said block being the rear combination work-positioning and staple-controlling block for a box or crate blank.

Figs. 46 and 47 are, respectively, on an enlarged scale, a side elevation and an end elevation of the second block from the right on the upper chain in Fig. 30, said block being one of the staple-controlling blocks placed intermediate the edges of a box section to control the position of a staple intermediate the first and last staple in the section.

Figs. 48 and 49 are similar views of the second block from the right on the upper chain in Fig. 32, said block being one of the combination work-positioning and staple-controlling blocks for insertion between slats of a crate section.

Figs. 50 and 51 are similar views of a modification of the block shown in Figs. 48 and 49.

Figs. 52 and 53 are similar views of the leading block on the lower chain in Figs. 30 and 32, said block being the leading work-positioning block for a box or crate.

Figs. 54 and 55 are similar views of the middle block on the lower chain in Figs. 30 and 32, said block being the work-positioning block for insertion between the two inside sections of a box or crate blank.

Figs. 56 and 57 are similar views of the blocks on the lower chain in Figs. 30 and 32, which are inserted between the first and second and the third and fourth sections, respectively, said blocks being work-positioning blocks for a box or crate blank.

Figs. 58 and 59 are similar views of the last block on the lower chain in Figs. 30 and 32, said block being the rear work-positioning block for a box or crate blank.

The machine selected for illustration is a wire-bound box blank machine adapted to produce a wirebound box blank such as is shown in Figs. 30 and 31, or a wirebound crate blank such as is shown in Figs. 32 and 33. Such a blank consists of a plurality of sections (usually four) of cleats $a$ and side sheets $b$ connected together in foldable relationship by binding wires $c$ secured to the sections by staples $d$ which are driven over the wires, through the side sheets and into or through the cleats. One or more intermediate binding wires are usually secured to the side sheets by staples driven over the wires through the side sheets and clenched on the under side of the side sheets.

The illustrative machine consists generally of means to position the cleats $a$ and side sheets $b$ in proper relationship and feed them to staplers which secure the cleats and sheets together and apply binding wire thereto by forming and driving staples over the binding wire, through the side sheets and into or through the cleats. The cleats and sheets are fed to the staplers continuously at approximately a uniform speed and the operations of the staplers are controlled to position the staples in the moving work at predetermined points only. Wire-severing mechanism is also provided to separate the wire-connected blanks after they pass the stapling mechanism.

Figure 3:
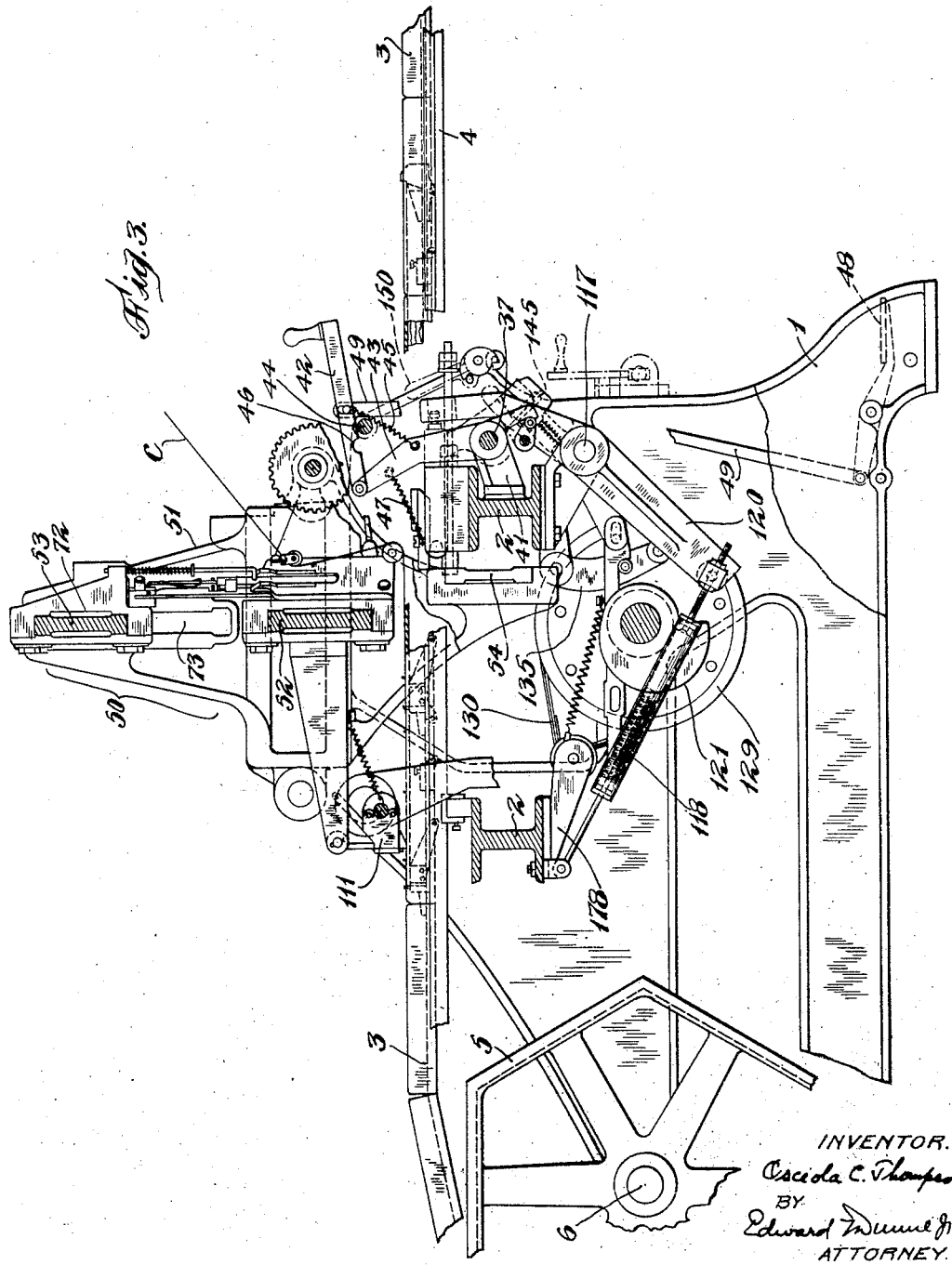
Fig. 3 is a sectional view of the machine taken on the line A—A of Fig. 2.
Figure 4:
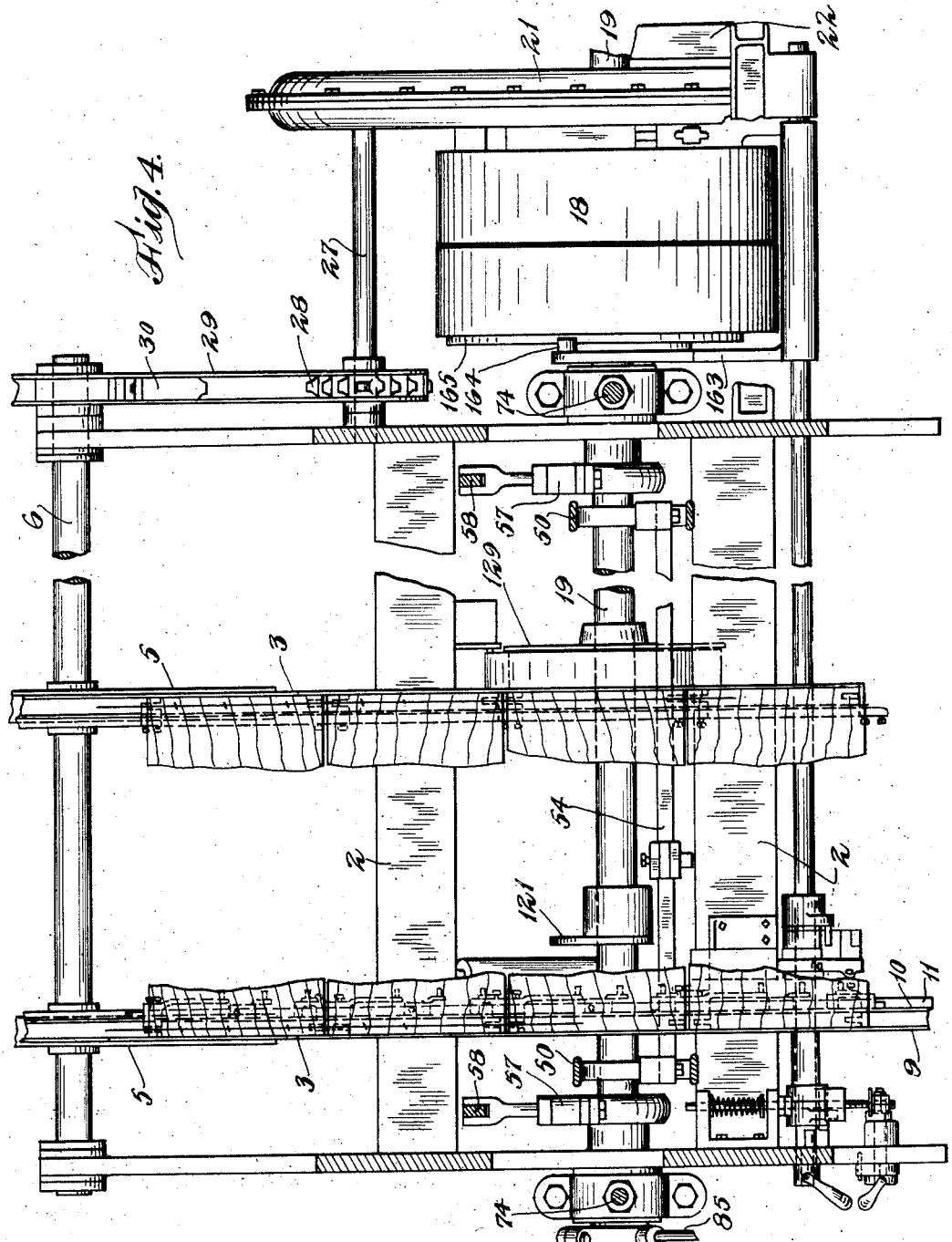
Fig. 4 is a sectional plan view of the machine taken on the line B—B of Fig. 2.

The several mechanisms are supported by side frames 1 suitably braced by cross-beams such, for example, as cross-beams 2 shown in Fig. 3.

The cleats $a$ and side sheets $b$ are positioned and fed on link chains 3 which travel on guide-supports 4 and are trained over driven sprocket wheels 5 fast on a shaft 6 at the delivery end of the machine and over idler sprocket wheels 7 on a shaft 8 at the receiving end of the machine; shafts 6 and 8 being journaled in the side frames of the machine. The links of chains 3 are preferably channel-shaped to receive the cleats $a$ and the outer flange 9 serves to prevent lateral movement of the side sheets *b* while the inner flange 10 serves as a support for the blocks which position the cleats and side sheets. A flange 11 projecting laterally from inner flange 10 is also provided for a purpose hereinafter explained. Chains 3 may be lengthened or shortened by the insertion or removal of links (shaft 8 being movable from and toward shaft 6) and said chains are also relatively adjustable laterally to accommodate boxes or crates of different dimensions.

As shown in Figs. 30 to 33 inclusive, the cleats *a* and side sheets *b* for a box or crate blank are positioned on chains 3 by blocks adjustably secured by set screws to one or the other of the flanges 10 and 11.

Blocks 12 on flange 10 of lower chain 3 in Figs. 30 and 32 function to position and assist in the feeding of the cleats and side sheets except the leading block 12 which functions only as a positioner.

Blocks 13 on flange 10 of upper chain 3 in Figs. 30 and 32 have the same positioning and feeding functions as the blocks 12 and in addition thereto they also function to control the stapling operations to locate staples in the work as hereinafter explained.

Blocks 14 on flange 11 of lower chain 3 in Fig. 32 function to position and assist in the feeding of crate side sheets.

Blocks 15 on flange 11 of upper chain 3 in Fig. 32 have the same positioning and feeding functions as the blocks 14 and in addition thereto they also function to control the stapling operations to locate staples in the crate side sheets *b* as hereinafter explained.

Blocks 16 on flange 11 of upper chain 3 in Fig. 30 have no work-positioning or feeding function but function to control the stapling operations to locate staples in the work as hereinafter explained.

Detailed views of work-positioning blocks, staple-controlling blocks and combination work-positioning and staple-controlling blocks are shown in Figs. 34 to 59 inclusive.

As best shown in Figs. 2, 4, 9 and 14, shaft 6, which drives work-feeding chains 3, is rotated by power communicated from a hub 17 of a drive pulley 18 on stapler shaft 19 through gear wheel 20 keyed to hub 17 and housed in casing 21 carried by brackets 22 secured to side frames 1, worm gear 23 fast on worm shaft 24 journaled in casing 21, worm gear 25 fast on shaft 24, gear wheel 26 fast on a shaft 27 journaled at one end in casing 21 and at the other end in side frames 1, sprocket wheel 28 fast on shaft 27, sprocket chain 29, and sprocket wheel 30 keyed to shaft 6. Sprocket wheel 28 is circular while sprocket wheel 30 is six-sided as are sprocket wheels 5, and sprocket wheel 30 is keyed to shaft 6 with its flat sides parallel with the flat sides of sprocket wheels 5 so that the feed of work-feeding chains 3 will not be affected by the irregular contour of sprocket wheels 5 and said chains will be fed at a uniform speed.

Drive pulley 18 is revolubly mounted on its hub 17 and a controllable clutch mechanism is provided between drive pulley 18 and its hub 17 so that the machine may be stopped without shifting the drive belt from the drive pulley to the idler pulley.

The clutch mechanism for clutching hub 17 to drive pulley 18 is best shown in Figs. 14 to 20 inclusive, and consists of a number of rollers 31 adapted to wedge between the inner surface of drive pulley 18 and cam surfaces 32 formed on the outer surface of hub 17. Rollers 31 are held in position between the drive pulley 18 and hub 17 by a ring member 33 having openings 34 for holding the rollers 31 in proper relative position. The side of ring member 33 which carries rollers 31 fits into a cutaway portion of the inner surface of drive pulley 18 and around the cam surfaces 32 on hub 17 as shown in Fig. 14 so that rollers 31 lie between the inner surface of drive pulley 18 and cam surfaces 32 on hub 17. The other side of ring member 33 is provided with a series of teeth 35 for engaging a stop arm 36 carried by a rock shaft 37 when said arm is lowered as hereinafter explained. When stop arm 36 is in engagement with one of the teeth 35, ring member 33 is held stationary and drive pulley 18 is free to ride idly on the outer surface of hub 17. When arm 36 is released from engagement with teeth 35, rollers 31 are forced into engagement with cam surfaces 32 through the action of expansion springs 38 each interposed between a stud 39 on ring member 33 and a stud 40 on hub 17, whereupon drive pulley 18 is clutched to hub 17 and rotates hub 17 until arm 36 is thrown into engagement with one of the teeth 35. When arm 36 engages a tooth 35, ring member 33 is stopped and the rollers 31 are released from wedging engagement with cam surfaces 32 by the continued movement of hub 17 (due to its momentum) against the action of springs 38 which springs resist excessive movement of hub 17 and are compressed by the movement of hub 17 sufficiently to force rollers 31 into engagement with cam surfaces 32 when arm 36 is again raised.

Rock shaft 37 which is journaled in brackets 41, bolted to cross-beam 2, is rocked in a clockwise direction to raise arm 36 out of engagement with teeth 35 by a hand lever 42 pivotally connected to the upper end of a lever 43, the lower end of which is fast on rock shaft 37. Hand lever 42 is yieldingly held down against a stud 44 on side frame 1 by a spring 45 extending between levers 42 and 43 so that when hand lever 42 is pulled to the right in Fig. 3 to rock rock shaft 37 and start the machine, a notch 46 on the under side of hand lever 42 will engage stud 44 and hold rock shaft 37 in rocked position against the action of a spring 47. Hand lever 42 may be released from stud 44 by raising said lever either by hand or by foot through a fulcrumed foot pedal 48 and lever 49 having a pin and slot connection with hand lever 42. Thus it will be seen that work-conveying chains 3 which feed the box or crate parts are caused to move continuously at approximately a uniform speed when hub 17 is clutched to drive pulley 18 and that the mechanism which clutches hub 17 to drive pulley 18 is controlled by hand lever 42.

The binding-wire-applying mechanism and the wire-severing mechanism are carried by a carriage 50 which is reciprocable over the work and parallel to the movement thereof. Carriage 50 consists of side frames 51 and cross-bars 52, 53 and 54. Side frames 51 are provided with extensions 55 slidable in guideways 56 of machine side frames 1.

Carriage 50 is reciprocated over the work in the guideways 56 by eccentrics 57 on stapler shaft 19 each operating through a bell crank lever 58 pivotally mounted on a stud shaft 59 on side frame 1 and connected at one end to the eccentric 57 and at the other end to a stud shaft 60 on side frame 51 of carriage 50. The arrangement of the parts is such that upon each revolution of stapler shaft 19, carriage 50 is moved synchronously with the work (during which time the staplers operate to drive a row of staples into the moving work) and is then returned to initial position where it remains stationary until shaft 19 is given another revolution, all as hereinafter described.

The binding wires to be stapled to the cleats and side sheets are carried by a series of reels 61 loosely mounted on a shaft carried by hangers 62 suspended from the upper framework of the machine. The binding wires are led from the reels 61 through rollers 63 and down over guide rollers 64 carried by brackets 65 secured to the lower heads of the staplers, and thence under rollers 67 at the feet of the staplers and are pulled along by reason of their attachment to the work.

The staple stock wire from which the staples are formed is carried by a series of reels 68, similar to reels 61, and passes over rollers 69 on the upper framework of the machine and is fed intermittently into the staplers in the manner hereinafter described.

One staple-forming and driving unit is provided for each binding wire to be stapled. One such unit is shown in detail in Figs. 23 to 29 inclusive and comprises lower and upper heads 70 and 71 detachably and adjustably mounted on cross-bars 52 and 53 of carriage 50, cross-bar 52 being fixed to the side frames 51 of carriage 50 while cross-bar 53 is carried by blocks 72 adapted to slide vertically in guideways 73 in side frames 51 of carriage 50. To impart vertical reciprocation to said blocks, they are connected by pitman 74 to eccentrics 75 on stapler shaft 19.

The staple stock wire is fed to the lower heads 70 of the staplers through feed rolls 76 and 77, roll 76 being splined to a shaft 78 journaled in side frames 51 of carriage 50, which shaft is rotated intermittently as hereinafter described, and roll 77 is loosely connected on an eccentric shaft 79 journaled in an arm 80 extending from the lower stapler body, said shaft 79 being pressed toward shaft 78 by a spring 81. To impart a positive rotation to feed rolls 76 and 77, they are provided with intermeshing gears 82 and 83.

Shaft 78 is rotated intermittently distances corresponding to the length of wire required to form staples by a ratchet and pawl mechanism 84 operated through a pitman 85 from eccentric 86 on stapler shaft 19.

The staple stock wire is fed by the feed rolls 76 and 77 through a tube 87 carried by arm 80 to a horizontal cutting tube 88 having a chamfer end at a suitable angle to form the staple points. The wire is fed through this cutting tube over a loop bar 89 carried by a holder 90 pivoted intermediate its end in a recess in head 70, said holder being adapted to rock on its pivot to introduce said loop bar into and out of a position beneath said wire as more fully hereinafter described.

To form a staple from the staple stock wire thus projecting beyond the cutting tube over the loop bar, there is provided a former 91 having a corner vertically chamfered to correspond to the chamfer of the cutting tube end and having a cutting edge 92 for shearing off the stock wire projecting from the cutting tube. To receive the severed wire stock, the lower end of the former is provided with a horizontal groove 93 of a depth corresponding to the diameter of the stock wire so that when the former is brought down toward the loop bar, as more fully hereinafter described, the severed stock wire will be temporarily held in said groove by said loop bar.

To bend the severed stock wire around the loop bar, the former 91 is provided with an elongated lateral recess 94 having therein opposed longitudinal grooves 95, each of a depth corresponding to the diameter of the staple stock wire and communicating with the horizontal groove 93. As a result, on the downward movement of the former 91, the stock wire in the horizontal groove is bent over the loop bar 89 and into the longitudinal grooves of the former recess thereby completing the staple.

To positively force the former downward to bend the staple wire over the loop bar as described, there is provided a spring-pressed dog 96 having its upper end pivoted to a block 97 bolted to an ear 98 projecting from the upper head 71. The lower end of said dog is directly above an upwardly projecting end of the former 91. As a result, when the upper head is moved downward, the former 91 will also be moved downward and will bend the staple stock wire over the loop bar to form a staple as described.

The former 91 is not moved positively entirely to the face of the box material but after the staple has been formed, the feeding dog 96 is moved out of engagement with the upper end of former 91 by a pin 99 projecting through said dog and adapted to engage bevelled or cam ends 100 of ribs 101 on said lower head. To move the former yieldingly on down to the box material and present the staple thereto, the former 91 is connected to an L-shaped rod 102, the upper end of which projects through an aperture in the upper head ear 98. A coil spring 103 is interposed between the lower face of said ear and a collar 104 fast on said rod 102.

To rock the loop bar 89 out from the position shown in Fig. 26 to the position shown in Fig. 27, there is provided a trip slide 105 secured to a back-bar 106 connected to the dog block 97, said slide being adapted to engage an inclined face 107 on the loop bar holder 90 and thereby automatically rock said loop bar out from beneath the staple loop and permit the staple to be carried down and present its point to the box material.

The staple, being thus positioned on the material, is then in readiness to be driven therethrough. To this end there is provided a driver 108 projecting into the lateral recess 94 of the former, said driver being secured to the back-bar 106.

On downward movement of the upper head of the stapler, the former 91 will move down and bend the staple stock wire over the loop bar 89. Then the latter will be rocked out from the staple loop and the dog pin 99 will engage the incline of the rib 101 and rock the dog out from engagement with the former. Further downward movement of the head through the spring 103 will present the former and the staple therein to the box material beneath the former. Continued downward movement of the head will cause the driver 108 to engage and drive the staple into the box material, the points of the staple being bent over or clenched by engagement with a usual anvil beneath the box material.

When head 71 is in its lowermost position, pin 99 on dog 96 has passed below bevelled or cam end 100 of rib 101 and a projection 109 on the lower end of dog 96 has snapped in beneath a notch 110 in the former 91 in position to engage said notch and raise the former immediately upon upward movement of upper head 71. This provision for raising former 91 immediately upon completion of the driving of a staple is made to prevent the former from dragging on the work when the stapler carriage 50 is returned to initial position for a stapling operation, it being understood that the carriage 50 moves with the work during a stapling operation and that upon completion of a stapling operation the carriage returns to initial position in a direction opposite to the movement of the work. Thus when upper head 71 starts its upward movement, projection 109 engages notch 110 of the former and raises the former until pin 99 on dog 96 engages cam surface 100 which engagement releases projection 109 from its engagement with notch 110. Dog 96 continues to rise with upper head 71 until it passes cam surface 100 and snaps in above the upper end of former 91 in position to force the former down upon the next descent of upper head 71. While dog 96 is being raised, driver 108 also moves upward in recess 94 of the former 91 and when projection 109 of dog 96 is disengaged from notch 110, the upper end of driver 108 engages the top of the recess 94 of the former and raises it up above the loop bar 89 whereupon slide 105 engages loop bar holder 90 and moves the loop bar beneath the former in readiness to form another staple.

Automatic binding-wire-severing mechanisms 111, (one for each wire) of the type disclosed in the application of Osceola C. Thompson, Serial No. 375,195, filed on the 20th day of April, 1920, are secured to lower head 70 of each stapler to sever the binding wires between box or crate blanks or parts. Said wire-severing mechanisms need not be described in detail herein as a detailed description of the same is given in said application Serial No. 375,195, reference to which is hereby made, it being sufficient to say that said wire-severing mechanisms enter spaces between box or crate blanks while the same are moving and sever the connecting wires without interrupting the feed of the work.

It will thus be seen that one revolution of stapler shaft 19 causes carriage 50 to move with the work and then return to initial position, and causes the staplers to form and drive one row of staples over the binding wire into the moving box parts.

Stapler shaft 19 is caused to revolve at selected times by clutching stapler shaft 19 to hub 17 of drive pulley 18. For this purpose a clutch mechanism is provided which clutches stapler shaft 19 to hub 17 of drive pulley 18 for one revolution of shaft 19 and then automatically disconnects.

Said clutch mechanism between stapler shaft 19 and hub 17 of drive pulley 18 is best shown in Figs. 14, 15, 16, 21 and 22, and consists of a ring member 112 which fits in a recess formed in hub 17 and carries wedge members 113 adapted to engage a cam 114 keyed to stapler shaft 19. Upon engagement of wedge members 113 with cam 114, hub 17 is locked with shaft 19 and causes shaft 19 to move therewith. The frictional engagement between ring member 112 and hub 17 forces wedge member 113 into wedging engagement with cam 114. To release the wedging engagement and break the connection between hub 17 and stapler shaft 19, ring member 112 is provided with an extension 115 adapted to engage an arm 116 fast on rock shaft 117 when said arm is lowered into the path of travel of said extension 115. When arm 116 engages extension 115, the movement of ring member 112 and wedge members 113 is arrested, thus permitting hub 17 to travel idly around ring member 112.

Figure 5:
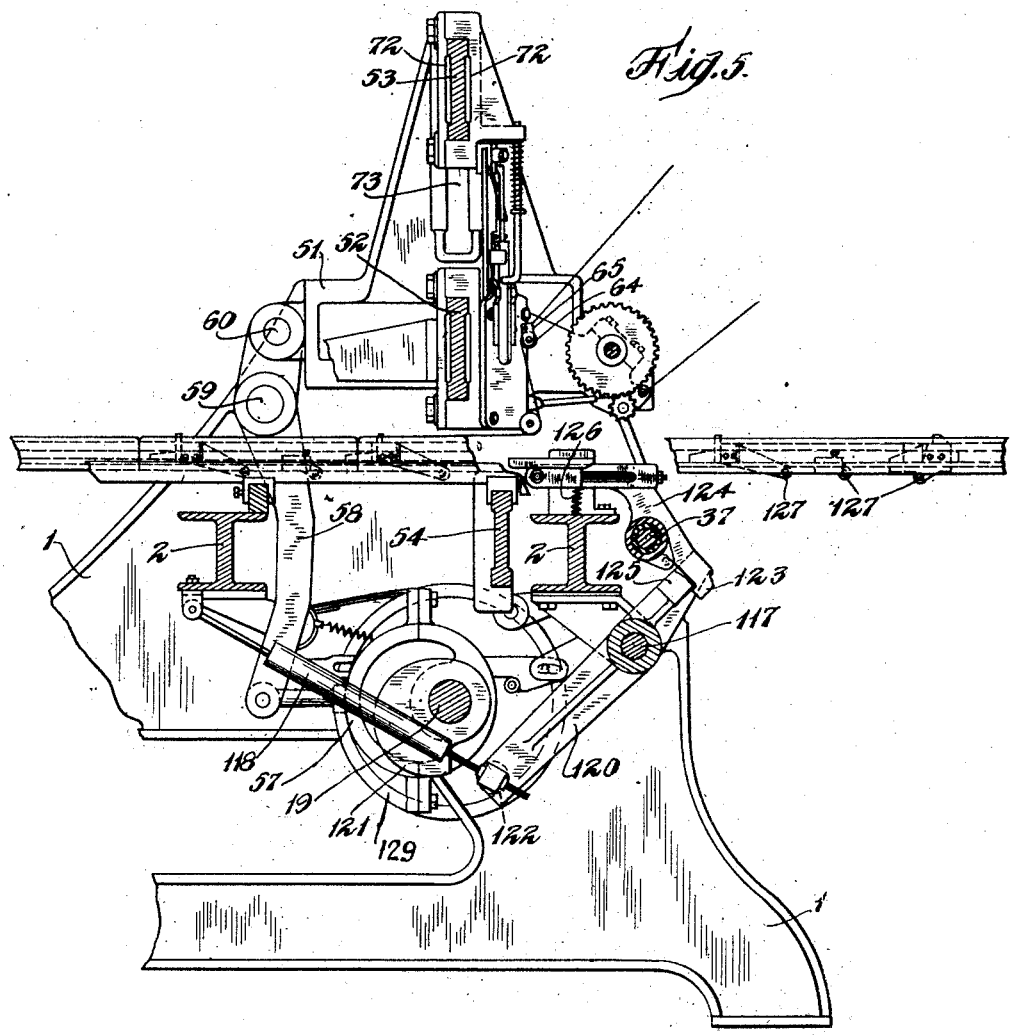
Fig. 5 is a sectional view of the machine taken on the line C—C of Fig. 2.

To clutch hub 17 to stapler shaft 19, rock shaft 117 is rocked in a clockwise direction viewing Fig. 5, thus raising arm 116 out of engagement with projection 115 on ring member 112. Rock shaft 117 is rocked in a clockwise direction by a spring 118 secured at one end to crossbeam 2 and at the other end to an arm 120 fast on shaft 117 at a point intermediate the ends of arm 120. Shaft 117 is rocked in a counterclockwise direction against the action of spring 118 by a cam 121 fast on stapler shaft 19 acting on a roller 122 on the lower end of arm 120. When cam 121 has rocked shaft 117 in a counterclockwise direction throwing arm 120 into engagement with projection 115 of ring member 112 and thereby breaking the clutch mechanism between hub 17 and stapler shaft 19, it is held in such position by a hook 123 on the lower end of a lever 124 pivotally mounted on shaft 37, said hook when in lowered position engaging a block 125 carried by arm 120. Hook 123 on lever 124 is normally held in lowered position to engage and hold block 125 by a compression spring 126 inserted between the upper end of lever 124 and cross-bar 2. Block 125 has a bevelled face which permits it to raise hook 123 against the action of spring 126 when block 125 is moved against hook 123 by the action of spring 118 on arm 120. When block 125 has passed hook 123, spring 126 will force hook 123 down behind the block 125 and prevent spring 118 from rocking shaft 117 until hook 123 is released from its engagement with block 125, as presently to be described. Thus it will be seen that shaft 117 is normally held by hook 123 in such position that arm 116 is in engagement with projection 115 of ring member 112 and hub 17 is free to ride idly about stapler shaft 19.

Hook 123 is released from engagement with block 125 to permit spring 118 to rock shaft 117 and raise arm 116 out of engagement with projection 115 of ring member 112 by trip members 127 located on one of the conveyer chains 3 relative to selected fastener-receiving points on the work, which trip members engage a cam surface 128 adjustably mounted on the upper end of lever 124 and depress the upper end of said lever against the action of spring 126, thus raising the lower end of said lever and raising hook 123 out of engagement with block 125 and permitting spring 118 to rock shaft 117 and raise arm 116 out of engagement with projection 115 of ring member 112, thereby clutching hub 17 to stapler shaft 19.

As shown in Figs. 30 to 33 inclusive, the trip members 127, for causing stapling operations which are located on one of the conveyer chains 3 relative to selected fastener-receiving points on the work, are formed as a part of or carried by the several blocks secured to flanges 9 and 10 of the upper chain 3 in Fig. 30. A series of blocks 16 may be employed to control all of the stapling operations but this would necessitate the setting of many blocks and result in considerable delay in setting up the many blocks for each new run of box blanks. To avoid the setting of so many blocks on said upper chain 3, applicant has combined, so to speak, certain of his staple-controlling blocks with his work-positioning and feeding blocks thus reducing the time required for a set-up of the machine and also definitely locating certain staples automatically by the setting of the work-positioning and feeding blocks. As shown in Figs. 30 and 31, the leading work-positioning block 13 carries a trip member 127 which operates to locate the first staple in the blank the proper distance from the forward edge of the blank; blocks 13 which are located between adjacent sections of a blank to position and feed the sections are provided with two trip members 127 operating to correctly position the two staples nearest the intersection between adjacent sections; while the rear block 13 is provided with a trip member 127 to locate the last staple in the blank. Thus by the mere setting of the work-positioning and feeding blocks for a blank, the operator has set trip members to accurately control the location of the first and last staple in every section of the blank (eight staples in the four section blank shown in Fig. 30) and is only required to set staple-controlling blocks 16 for staples desired intermediate the first and last staples of each section (four such blocks being required for the blank shown in Fig. 30).

The same advantages, but to a greater extent, result from the use of combination work-positioning and staple-controlling blocks in crate manufacture. As shown in Figs. 32 and 33, the positioning blocks 15, which position the slats of a crate section intermediate the outside edges of the section, are provided with two trip members 127 each adapted to locate a row of staples in the slats so that in the crate structure shown in Figs. 32 and 33, no staple-positioning blocks 16 need be set as the setting of the work-position blocks automatically sets all the staple-controlling trip members required for the blank.

Thus it will be seen that each trip member 127 by depressing lever 124 causes one revolution of stapler shaft 19 and one row of staples to be driven across the work a predetermined distance from the edge of a section and that each row of staples driven into the work is definitely located relative to its adjacent row of staples. It will also be noted that the rows of staples may be spaced any distance apart greater than the minimum distance for which the machine may be designed.

The clutching engagement between hub 17 and stapler shaft 19 is automatically broken upon the completion of each revolution of stapler shaft 19 when cam 121 acting on roller 122 moves arm 120 into position where it is engaged and held by hook 123 engaging block 125.

To prevent overthrow of stapler shaft 19 when the clutch between the said shaft and hub 17 is broken, a braking mechanism is provided which operates automatically to stop shaft 19 upon completion of each revolution.

Figure 6:
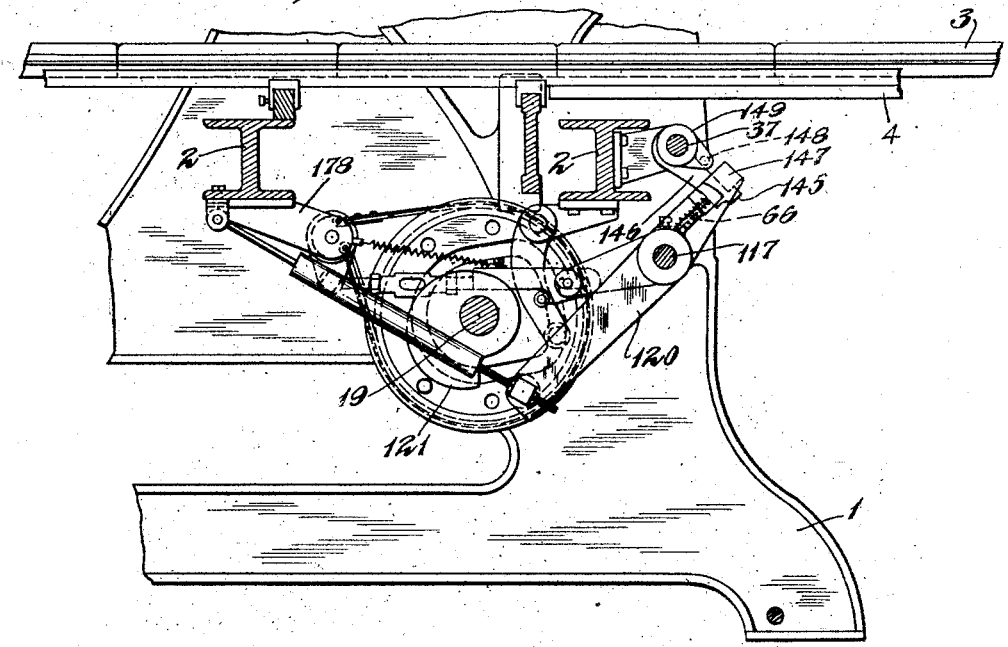
Fig. 6 is a sectional view of the machine taken on the line D—D of Fig. 2.
Figure 7:
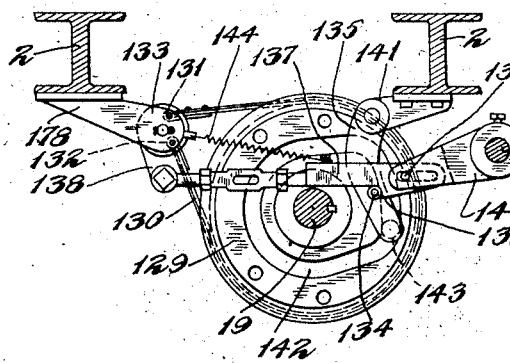
Fig. 7 is an enlarged vertical section through a portion of the machine showing the braking mechanism for the stapler shaft.
Figure 8:
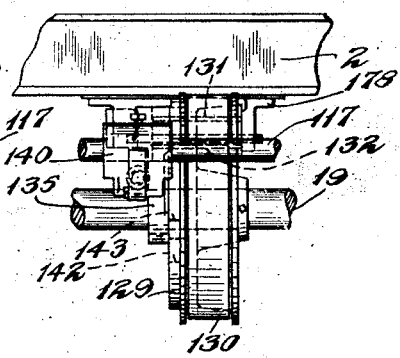
Fig. 8 is an enlarged front elevation of the braking mechanism shown in Fig. 7.

As best shown in Figs. 6, 7 and 8, the braking mechanism for stapler shaft 19 comprises a brake wheel 129 fast on shaft 19 and a divided brake-band 130, the ends of which are secured at separated points 131 and 132 to a member 133 pivotally mounted on a bracket 178 secured to cross-beam 2. When member 133 is rocked in a counterclockwise direction viewing Fig. 6, the brake-band 130 is tightened about brake wheel 129 and when member 133 is rocked in a clockwise direction, said band is loosened about said wheel and the braking action is released.

Member 133 is rocked in a counterclockwise direction to tighten the band about the wheel by a pin 134 carried by an arm 135, which pin 134, when arm 135 is moved to the right in Fig. 6, engages a hook 136 formed on the underside of a rod 137 pivotally connected at one end to an extension 138 of member 133 and at the other end having a slotted connection with a pin 139 carried by an arm 140 fast on shaft 117. Arm 135 which is pivoted at its upper end from a bracket 141 secured to cross-beam 2 is moved back and forth by a cam groove 142 in brake-wheel 129 acting on a roller 143 on the lower end of arm 135. Thus when arm 135 is moved to the right in Fig. 6, pin 134 engages hook 136 on rod 137 and moves said rod, thus turning member 133 in a counterclockwise direction and tightening the brake-band about the wheel. The arrangement of the parts is such that the brake-band is tightened as the stapler shaft completes a revolution.

To release the brake-band, rod 137 is raised by pin 139 on arm 140, thus releasing hook 136 from engagement with pin 134 on arm 135 and permitting a spring 144 to move rod 137 to the left in Fig. 6 thereby moving member 133 in a clockwise direction and releasing the brake. The movement of rod 137 is limited by the extent of the slot at its end into which pin 139 is inserted. Arm 140 and its pin 139 are raised when rock shaft 117 is rocked in a clockwise direction to clutch hub 17 to stapler shaft 19 thus releasing the brake when the clutch is thrown in.

Thus it will be seen that the braking mechanism for the stapler shaft 19 is automatically thrown on at the completion of a revolution of shaft 19 and held on until it is automatically released at the start of the next revolution of said shaft.

To positively prevent the clutching mechanism from clutching hub 17 to shaft 19 when the machine is being stopped, a hook 145 carried at the lower end of an arm 146 is thrown into engagement with a block 147 carried by arm 120 when rock shaft 117 has been rocked in a counterclockwise direction by cam 121. Arm 146 is loose on shaft 37 and is forced upward by a spring 66 when shaft 37 is rocked in a counterclockwise direction to brake the clutching connection between drive pulley 18 and hub 17; arm 146 being held down against the action of spring 66 by a pin 148 carried by a collar 149 fast on shaft 37. As heretofore explained, shaft 37 is rocked by the operator through hand lever 42.

Provision is made to permit work-conveying chains and the staple-controlling blocks carried thereby to move without operating the staplers. The mechanism for this purpose is best shown in Figs. 3, 4, 10 and 11 and consists of hand lever 150 journaled in side frame 1 and carrying a roller 152 adapted to engage and move an arm 153 keyed at its lower end to rock shaft 117 and having a slot connection at its upper end with a spring-buffer-shaft 154 carried by brackets 155 supported by side frame 1. When hand lever 150 is moved to the right in Fig. 11, roller 152 moves arm 153 to the left thus rocking shaft 117 in a counterclockwise direction and throwing arm 116 into engagement with projection 115 of ring member 112. Thus hub 17 is prevented from operating shaft 19 and the chains 3 and staple-controlling blocks carried thereby may continue to move without causing any stapling operation. The mechanism just described is provided principally as an assistance to the operator in setting up his machine, for a run of box blanks.

Mechanism is also provided to cause stapling operations at regular intervals. (1½ inches apart in the illustrative machine). Such mechanism is best shown in Fig. 10 and consists of a pin 156 carried by a collar 157 fast on a sleeve 158 loosely mounted on shaft 37, which pin is adapted when the sleeve 158 is rocked to engage and raise the lower end of lever 124 so that hook 123 cannot engage block 125 on arm 120. Sleeve 158 is rocked by a hand lever 159 journaled in side frame 1 and having an arm 160 adapted to engage and move an arm 161 on a collar 162 fast on sleeve 158. Thus when hand lever 159 is moved to the left in Fig. 11, pin 156 raises the lower end of lever 124 and hook 123 is thereby held free of engagement with block 125 on arm 120 and said arm through the action of spring 118 and cam 121 will rock shaft 117 at regular intervals, thus clutching hub 17 to shaft 19 at regular intervals.

It is desirable that the machine be stopped only when the upper cross-bar 53 of the stapler carriage 50 is in its uppermost position. Mechanism is therefore provided to prevent the machine from stopping when said bar 53 is in any position other than its uppermost position. Such mechanism consists of an arm 163 fast on rock shaft 37 and carrying a roller 164 which rides on a cam 165 fast on shaft 19. The arrangement is such that cam 165 acting through arm 163 prevents rock shaft 37 from rocking arm 36 into engagement with teeth 35 of ring member 33 except when bar 53 is in its uppermost position.

Figure 2:
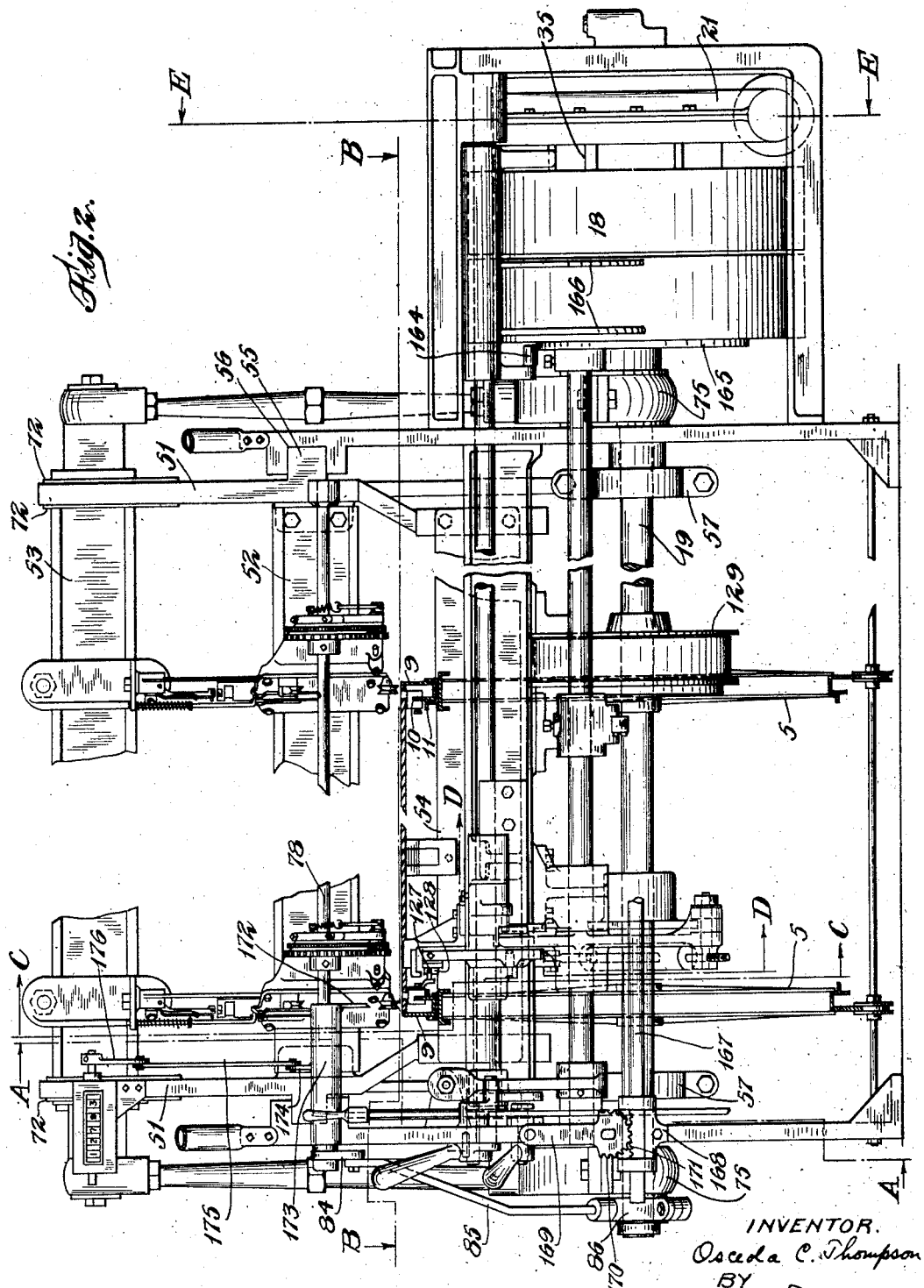
Fig. 2 is an enlarged front elevation of a portion of the illustrative machine viewed from the right in Fig. 1 at a point immediately in front of the stapling mechanism.

The drive belt is shifted from the drive pulley to the loose pulley by belt guides 166 fast on the end of a rod 167 slidable longitudinally in brackets 168 at either side of the machine. Said rod 167 is shifted by a hand lever 169 pivoted to the bracket 168 and having teeth 170 meshing with teeth 171 on rod 167 as shown in Fig. 2.

Mechanism for automatically recording the number of box blanks made on the machine is provided. Such mechanism comprises a counter 177, of any approved type, bolted to side frame 51 of carriage 50 and means automatically to operate the same upon completion of each box blank. The operating means for the counter comprises an arm 172 fast on a collar 173 loosely mounted on shaft 78, said collar carrying an arm 174 which when lowered operates the counter 177 through links 175 and 176. Arm 172 rides on top of the box blank and when the end of the blank passes said arm it drops into the gap between blanks, thereby rocking collar 173 and lowering arm 174 to operate the counter. After the counter has registered, arm 172 rides upon the next blank and rides thereon until the next gap permits the arm to drop and operate the counter. Thus it will be seen that the number of blanks passing through the machine is automatically recorded and that such recording or counting is controlled by the passage of the box materials through the machine.

The operation of the machine is as follows: The operator first sets work-feeding and work-positioning blocks 12 on lower chain 3 in Fig. 30 and then sets combination work-positioning and staple-controlling blocks 13 on upper chain 3 in Fig. 30, the setting of blocks 13 automatically determining the positions of the first and last row of staples in each section. He then sets staple-controlling blocks 16 intermediate the blocks 13 at points where rows of staples are desired. The binding wires and the staple stock wires having been threaded in the usual manner and the cleats $a$ and side sheets $b$ having been positioned on the conveyer chains, the operator pulls hand lever 42 to the right in Fig. 3 rocking shaft 37 in a clockwise direction and raising arm 36 out of engagement with teeth 35 of ring member 33 and thereby clutching drive pulley 18 to its hub 17 and causing conveyer chains 3 and the work to move forward beneath the staplers. As each staple-controlling trip member 127 strikes cam surface 128 of arm 124, it raises hook 123 from engagement with block 125 on the upper end of arm 120, thus permitting spring 118 to rock shaft 117 in a clockwise direction raising arm 116 from engagement with projection 115 of ring member 112 and clutching the hub 17 to stapler shaft 19 for one revolution of said shaft. As hereinbefore explained, one revolution of stapler shaft 19 causes carriage 50 to reciprocate over the work and causes the staplers to operate driving a row of staples across the work. After trip member 127 has passed cam surface 128 on arm 124, hook 123 is returned by spring 126 to initial position where it engages and holds block 125 after block 125 has been returned to initial position by the action of cam 121 acting on roller 122 carried at the lower end of arm 120. The action of cam 121 on roller 122 rocks shaft 117 in a counterclockwise direction and throws arm 116 into engagement with projection 115 of ring member 112 and breaks the clutch connection between hub 17 and stapler shaft 19. As stapler shaft 19 completes its revolution, brake band 130 is tightened about the brake wheel, thus locking stapler shaft 19 against further movement, all as hereinabove described. The machine continues to operate driving a row of staples each time a trip member 127 engages cam surface 128 on arm 124. To stop the machine, the operator raises lever 42 either by hand or by the foot pedal 48, thus permitting spring 47 to rock shaft 37 in a counterclockwise direction to throw arm 36 into engagement with one of the teeth 35 of ring member 33, cam 165 on shaft 19 preventing arm 36 from engaging a tooth 35 when the staplers are in any position other than their uppermost position. The rocking of shaft 37 in a counterclockwise direction to break the connection between the drive pulley and hub 17 also causes hook 145 on the lower end of arm 146 to be thrown into engagement with block 147 carried by arm 120, thus preventing the clutch mechanism between hub 17 and stapler shaft 19 from operating while the machine is being stopped. While setting up the machine, or at other times, the operator may nullify the action of the staple-controlling trip members 127 and permit chains 3 and the trip members 127 to move beneath the staplers without operating the staplers by moving hand lever 150 to the right in Fig. 11, all as hereinabove explained. If during the run of the machine the operator should desire to have staples driven at regular intervals instead of at the points determined by the location of the staple-controlling members 127, he may do so by moving hand lever 159 to the left in Fig. 11, all as hereinabove explained. The automatic counter registers the number of blanks passing through the machine.

Obviously, the invention is not limited to the particular embodiment thereof shown for illustration but may be variously modified and embodied in different combinations and sub-combinations.

Having described the invention, what is claimed is:

1. A machine for use in making boxes comprising, in combination, means to position box parts; fastener-setting mechanism adapted to drive fasteners into the box parts a certain minimum distance apart; means to cause relative progression between said mechanism and the box parts; and means actuated by said positioning means and controlling operations of said fastener-setting mechanism to position fasteners in the work at points spaced apart a distance equal to a minimum distance plus a fractional part of a minimum distance.

2. A machine for use in making boxes comprising, in combination, means to position box parts; fastener-setting mechanism for securing said parts together; means to feed box parts continuously to said mechanism; and means actuated by said positioning means to control operations of said fastener-setting mechanism.

3. A machine for use in making boxes comprising, in combination, means to position box parts; fastener-setting mechanism adapted to drive fasteners into the box parts a certain minimum distance apart; means to feed the box parts; and means actuated by said positioning means and controlling operations of said fastener-setting mechanism to position fasteners in the work at points spaced apart a distance equal to a minimum distance plus a fractional part of a minimum distance.

4. A machine for use in making boxes comprising, in combination, means to position box parts; fastener-setting mechanism operable upon moving box parts; and means actuated by said positioning means for controlling operations of said mechanism.

5. A machine for use in making boxes comprising, in combination, means to position box parts; fastener-setting mechanism operable upon moving box parts; and means controlled by said positioning means for locating fasteners at predetermined points in the work.

6. A machine for use in making boxes comprising, in combination, means to position box parts; fastener-setting mechanism operable during movement with the box parts; means to cause said mechanism and the box parts to move together; and means actuated by said positioning means for controlling operations of said mechanism.

7. A machine for use in making boxes comprising in combination, endless conveying means to feed box parts; fastener-setting mechanism adapted to drive fasteners into the box parts a certain minimum distance apart; and means actuated by said conveying means and controlling operations of said fastener-setting mechanism to position fasteners in the work at points spaced apart a distance equal to a minimum distance plus a fractional part of a minimum distance.

8. A machine for use in making boxes comprising, in combination, means to feed box parts, including devices for engaging the box parts; fastener-setting mechanism operable upon moving box parts; and means actuated by said devices for controlling operations of said mechanism.

9. A machine for use in making boxes comprising, in combination, means to feed box parts, including devices for engaging the box parts; fastener-setting mechanism operable upon moving box parts; and means controlled by said devices for locating fasteners at predetermined points in the work.

10. A machine for use in making boxes comprising, in combination, means to feed box parts continuously, including devices for engaging the box parts; means to drive fasteners into the moving box parts; and means actuated by said devices for controlling operations of said mechanism.

11. A machine for use in making boxes comprising, in combination, means to position box parts; fastener-setting mechanism adapted to drive fasteners into the box parts a certain minimum distance apart; means to cause relative progression between said mechanism and the box parts; and means actuated by said positioning means and controlling operations of said fastener-setting mechanism to locate fasteners in the box parts any distance apart which is greater than said minimum distance.

12. A machine for use in making boxes comprising, in combination, means to position box parts; means to feed the box parts continuously at approximately a uniform speed; fastener-setting mechanism adapted to drive fasteners into the moving box parts a certain minimum distance apart; and means actuated by said positioning means and controlling operations of said fastener-setting mechanism to locate fasteners in the box parts any distance apart which is greater than said minimum distance.

13. A machine for use in making boxes comprising, in combination, means to position box parts; means to feed the box parts continuously at approximately a uniform speed; fastener-setting mechanism normally inactive during the feed of the box parts but adapted when thrown into operation to drive a fastener in to the moving box parts; and means controlled by said positioning means to cause operations of said mechanism at varied intervals.

14. A machine for use in making boxes comprising, in combination, means to position box parts; means to feed the box parts continuously at approximately a uniform speed; fastener-setting mechanism normally inactive during the feed of the box parts but adapted when thrown into operation to drive a fastener into the moving box parts; and means controlled by said positioning means to cause operations of said mechanism at selected times to locate fasteners at predetermined points in the work.

15. A machine for use in making boxes comprising, in combination, means to position box parts; fastener-setting mechanism normally inactive during the passage of the box parts thereunder but adapted when thrown into operation to drive a fastener into the box parts; means to cause relative progression between said mechanism and the box parts; and means controlled by said positioning means to cause operations of said mechanism at selected times to locate fasteners at predetermined points in the work.

16. A machine for use in making boxes comprising, in combination, means to position box parts; fastener-setting mechanism normally inactive during the passage of the box parts thereunder but adapted when thrown into operation to drive a fastener into the box parts; means to cause relative progression between said mechanism and the box parts; and means controlled by said positioning means to cause operations of said mechanism at varied intervals.

17. A machine for use in making box or crate blanks comprising, in combination, work-forwarding means including blocks for positioning the box or crate parts; fastener-setting mechanism for driving fasteners into moving box or crate parts; and means actuated by said blocks for controlling operations of said mechanism.

18. A machine for use in making box or crate blanks comprising, in combination, work-forwarding means including blocks for positioning the box or crate parts; fastener-setting mechanism for driving fasteners into moving box or crate parts; and means controlled by said blocks for locating fasteners at predetermined points in the work.

19. A machine for making box or crate blanks comprising, in combination, work-forwarding means including blocks for positioning box parts; fastener-setting mechanism for driving fasteners into moving box parts, said fastener-setting mechanism being normally inactive but adapted to be thrown into operation at selected times to cause a fastener-setting operation; and means controlled by said blocks to cause operations of said fastener-setting mechanism.

20. A machine for making box or crate blanks comprising, in combination, work-forwarding means including blocks for positioning box parts; fastener-setting mechanism for driving fasteners into moving box parts, said fastener-setting mechanism being normally inactive but adapted to be thrown into operation at selected times to cause a fastener-setting operation; and means to cause operations of said fastener-setting mechanism at selected times, said means being controlled by said blocks certain of which being adapted to control a plurality of fastener-setting operations.

21. A machine for use in making boxes comprising, in combination, fastener-setting mechanism normally inactive during the passage of the box parts thereunder; means to feed box parts continuously to said mechanism including blocks between adjacent box parts; and means controlled by one of said blocks to locate a fastener in each of its adjacent box parts.

22. A machine for use in making boxes comprising, in combination, fastener-setting mechanism normally inactive during the passage of the box parts thereunder; means including blocks to feed box parts continuously to said mechanism; and means controlled by one of said blocks for locating a plurality of fasteners in the box parts.

23. A machine for use in making boxes comprising, in combination, fastener-setting mechanism normally inactive during the passage of the box parts thereunder; means including blocks to feed box parts continuously to said mechanism; and means controlled by one of said blocks for locating the last fastener in one box part and the first fastener in another box part.

24. A machine for making a wirebound foldable box blank having a plurality of separate sections of cleats and sheets secured together and connected by binding wire, comprising means to position and feed said plurality of sections including blocks for the front and rear edges of the blank and blocks between adjacent sections of the blank; binding-wire-applying means including fastener-setting mechanism for driving fasteners into moving box parts, said mechanism being normally inactive during the operation of the machine but adapted to be thrown into operation at selected times to drive fasteners into the work at predetermined points; means for causing operations of the fastener-setting mechanism, said means being controlled by said blocks to position the first and last fasteners driven into the several sections of the blank; and other blocks intermediate said first mentioned blocks for controlling the location of fasteners intermediate the first and last fasteners of each of the several sections.

25. A machine for use in making boxes comprising, in combination, endless work-forwarding chains; means to move said chains continuously at approximately a uniform speed; fastener-setting mechanism normally inactive during the passage of the box parts thereunder and adapted when thrown into operation to drive fasteners into the moving work; blocks on one of said chains for causing operations of the fastener-setting mechanism in accordance with the location of said blocks on said chain; and means to nullify the operation of said blocks whereby said chains and said blocks may move without causing operations of the fastener-setting mechanism.

26. A machine for use in making boxes comprising, in combination, endless work-forwarding chains; means to move said chains continuously at approximately a uniform speed; fastener-setting mechanism normally inactive during the passage of the box parts thereunder and adapted when thrown into operation to drive fasteners into the moving work; blocks on one of said chains for causing operations of the fastener-setting mechanism in accordance with the location of said blocks on said chain; and means to nullify the operation of said blocks and cause operations of said mechanism at regular intervals.

27. A machine for use in making boxes or crates comprising, in combination, work-forwarding means; fastener-setting mechanism; an operating shaft for said fastener-setting mechanism; a drive pulley on said shaft; a hub for said drive pulley; a controllable clutch between said pulley and its hub; a controllable clutch between said hub and said shaft; and means automatically to control said last mentioned clutch.

28. A machine for use in making boxes or crates comprising, in combination, work-forwarding means; fastener-setting mechanism; an operating shaft for said fastener-setting mechanism; a drive pulley on said shaft; a hub for said drive pulley; a controllable clutch between said pulley and its hub; and a controllable clutch between said hub and said shaft, said last mentioned clutch being automatically controlled by the work-forwarding means to cause operations of said mechanism at selected times to locate fasteners at predetermined points in the work.

29. A machine for use in making boxes or crates comprising, in combination, work-forwarding means; fastener-setting mechanism; an operating shaft for said fastener-setting mechanism; a drive pulley on said shaft; a hub for said drive pulley; a controllable clutch between said pulley and its hub; and a controllable clutch between said hub and said shaft, said work-forwarding means being driven from said hub and said fastener-setting mechanism being operated by said shaft whereby the work-forwarding means may be moved without causing operations of said fastener-setting mechanism.

30. A machine for use in making boxes comprising, in combination, means to position box parts; binding-wire-applying means including fastener-setting mechanism adapted to drive staples over binding wire into the box parts a certain minimum distance apart; means to cause relative progression between said binding-wire-applying means and the box parts; and means actuated by said positioning means and controlling operations of said fastener-setting mechanism to position fasteners in the box parts at points spaced apart a distance equal to a minimum distance or distances plus a fractional part of a minimum distance.

31. A machine for use in making boxes comprising, in combination, means to position box parts; binding-wire-applying means including fastener-setting mechanism adapted to drive staples over binding wire into the box parts a certain minimum distance apart; means to feed the box parts to said binding-wire-applying means; and means actuated by said positioning means and controlling operations of said fastener-setting mechanism to position fasteners in the work at points spaced apart a distance equal to a minimum distance or distances plus a fractional part of a minimum distance.

32. A machine for use in making boxes comprising, in combination, means to position box parts; binding-wire-applying means including fastener-setting mechanism operable-upon moving box parts; and means actuated by said positioning means for controlling operations of said mechanism.

33. A machine for use in making boxes comprising, in combination, means to feed box parts, including devices for engaging the box parts; binding-wire-applying means including fastener-setting mechanism operable upon moving box parts; and means actuated by said devices and controlling operations of said mechanism to locate fasteners at predetermined points in the work.

34. A machine for use in making box or crate blanks comprising, in combination, work-forwarding means including blocks for positioning box or crate parts; binding-wire-applying means including fastener-setting mechanism operable upon moving box or crate parts; and means actuated by said blocks for controlling operations of said mechanism.

35. A machine for making box or crate blanks comprising, in combination, work-forwarding means including blocks for positioning box parts; binding-wire-applying means including fastener-setting mechanism for driving fasteners into moving box parts, said fastener-setting mechanism being normally inactive but adapted to be thrown into operation at selected times to cause a fastener-setting operation; and means controlled by said blocks to cause operations of said fastener-setting mechanism.

36. A machine for use in making boxes comprising, in combination, means to position box parts; binding-wire-applying means including fastener-setting mechanism adapted to drive fasteners into the box parts a certain minimum distance apart; means to cause relative progression between the box parts and said binding-wire-applying means; and means actuated by said positioning means and controlling operations of said fastener-setting mechanism to locate fasteners in the box parts any distance apart which is greater than said minimum distance.

37. A machine for use in making boxes comprising, in combination, means to position box parts; means to feed the box parts continuously at approximately a uniform speed; binding-wire-applying means including fastener-setting mechanism normally inactive during the feed of the box parts but adapted when thrown into operation to drive a fastener over the binding wire into the moving box parts; and means controlled by said positioning means to cause operations of said fastener-setting mechanism at varied intervals.

38. A machine for use in making boxes comprising, in combination, means to position box parts; binding-wire-applying means including fastener-setting mechanism normally inactive during the passage of the box parts thereunder but adapted when thrown into operation to drive a fastener into the box parts; means to cause relative progression between said mechanism and the box parts; and means controlled by said positioning means to cause operations of said mechanism at selected times to locate fasteners at predetermined points in the work.

39. A machine for use in making boxes comprising, in combination, work-forwardly means including blocks for positioning box parts; binding-wire-applying means including fastener-setting mechanism movable with the work during fastener-setting operations; and means controlled by said blocks for moving said mechanism with the work.

40. A machine for use in making boxes comprising, in combination, work-forwarding means including blocks for positioning box parts; binding-wire-applying means including fastener-setting mechanism movable with the work during fastener-setting operations; and means controlled by said blocks to move said mechanism with the work and to cause a fastener-setting operation during the movement of said mechanism with the work.

41. A machine for use in making boxes comprising, in combination, work-forwardly means including blocks to position box parts; binding-wire-applying means including fastener-setting mechanism movable with the work during fastener-setting operations; a carriage for said fastener-setting mechanism; and means controlled by said blocks for moving said carriage with the work.

42. A machine for use in making boxes comprising, in combination, means to feed box parts, including devices for positioning the box parts; fastener-setting mechanism reciprocable longitudinally over the box parts; and means controlled by said positioning devices to cause reciprocations of said fastener-setting mechanism.

43. A machine for use in making boxes comprising, in combination, means to position and feed box parts; fastener-setting mechanism reciprocable vertically and operable to drive fasteners into moving box parts; and means to prevent the machine from stopping when the fastener-setting mechanism is in any position other than its uppermost position.

44. A machine for use in making boxes comprising, in combination, means to position box parts; binding-wire-applying means including fastener-setting mechanism; means to feed box parts continuously to said mechanism; and means actuated by said positioning means to control operations of said fastener-setting mechanism.

45. A machine for use in making boxes comprising, in combination, means to feed box parts continuously, including devices for engaging the box parts; binding-wireapplying means including fastener-setting mechanism operable to drive fasteners into moving box parts; and means actuated by said devices to control operations of said mechanism.

46. A machine for use in making boxes comprising, in combination, a conveyer to feed box parts, fastener-setting mechanism operable upon moving box parts, fastener-positioning devices located on said conveyer relative to selected fastener-receiving points on the work, and means controlled by said devices to control operations of said fastener-setting mechanism to locate fasteners at said selected fastener-receiving points.

In testimony whereof, I have signed my name to this specification.

OSCEOLA C. THOMPSON.